United States Patent
Yang

Patent Number: 6,032,766
Date of Patent: Mar. 7, 2000

[54] SEAT FOR FASTENING CURVED TUBE OF V-TYPE BRAKE OF BICYCLE

[75] Inventor: Chao-Ta Yang, Taichung, Taiwan

[73] Assignee: Dia-Compe, Taiwan, Co., Ltd., Taichung, Taiwan

[21] Appl. No.: 09/053,735

[22] Filed: Apr. 2, 1998

[51] Int. Cl.[7] ...................................................... B62L 1/06
[52] U.S. Cl. .................... 188/24.19; 188/24.22
[58] Field of Search ........................... 188/24.22, 24.12, 188/24.19, 24.11, 73.1

[56] References Cited

U.S. PATENT DOCUMENTS 2,699,228  1/1955  Mennesson ........................... 188/24.19

FOREIGN PATENT DOCUMENTS 0914557  10/1946  France ................................. 188/24.12

*Primary Examiner*—Mark T. Le
*Assistant Examiner*—Sarah Sawhill
*Attorney, Agent, or Firm*—Browdy and Neimark

[57] ABSTRACT

A seat for fastening the curved tube of a bicycle V-type brake is composed of two connection members, a seat body, and a torsion spring. The connection members are fastened pivotally and coaxially with a first brake arm of the bicycle V-type brake by a first pivot. The seat body is fastened pivotally with the connection members by a second pivot and is provided with a first retaining portion. The seat body has an end plate, which is fastened with one end of the curved tube. The torsion spring is fitted over the second pivot such that one end of the torsion spring urges the first pivot, and that another end of the torsion spring urges the first retaining portion of the seat body. When the brake cable is triggered, the first brake arm and the second brake arm are actuated to cause the brake shoes to make contact with the wheel rim. In the meantime, the seat body is caused to swivel by a reaction force which is brought about by the brake cable and is greater than the torsional force of the torsion spring. The torsion spring serves to provide a damping effect to prolong the lock-up time of the brake shoes. The value of the torsional force of the torsion spring can be changed by rotating the first pivot such that one end of the torsion spring urges one of a plurality of retaining surfaces of the first pivot.

7 Claims, 5 Drawing Sheets

6,032,766

SEAT FOR FASTENING CURVED TUBE OF V-TYPE BRAKE OF BICYCLE

FIELD OF THE INVENTION

The present invention relates generally to a bicycle V-type brake, and more particularly to a seat for fastening a curved tube of the bicycle V-type brake.

BACKGROUND OF THE INVENTION

As shown in FIG. 1, a bicycle V-type brake 10 of the prior art is composed of two brake arms 10A, two brake shoes 10B, a curved tube 10C, a curved tube fastening seat 10D, and a brake cable 10E, The brake cable 10E is fastened at one end thereof with a brake lever (not shown in the drawing).

As shown in FIG. 2, before the brake shoe 10B is in contact with the bicycle wheel rim, the grip force (F) of the brake lever is constant, as indicated by a line "A" in FIG. 2. As soon as the brake shoe 10B makes contact with the bicycle wheel rim, the grip force (F) increases rapidly, as shown by the line "B" in FIG. 2. There is a considerably small lever stroke (S1), which is the distance between a contact point (C) of the brake shoe 10B with the wheel rim and a lock-up point (D) of the brake shoe 10B with the wheel rim. That is to say that the lever stroke (S1) takes place in a relatively short period of time, thereby unabling the bicyclist to respond in time to avert the overturning of the bicycle.

With a view to overcoming the drawbacks of the prior art bicycle brake described above, this inventor of the present invention disclosed an improved version of the bicycle V-type brake consisting of two brake arms which are fastened pivotally together. The improved version is not compatible with the prior art bicycle brake in term of the specifications and must be therefore further improved.

SUMMARY OF THE INVENTION

It is therefore the primary objective of the present invention to provide an improved seat for fastening the curved tube of the bicycle V-type brake such that the lever stroke of the brake shoes is prolonged to safeguard the bicyclist.

It is another objective of the present invention to provide an improved seat for fastening the curved tube of the bicycle V-type brake such that the improved seat is compatible with the brake arms of the conventional V-type brakes.

In keeping with the principle of the present invention, the foregoing objectives of the present invention are attained by a curved tube fastening seat, which is fastened pivotally at one end thereof with the top end of a first brake arm and at another end thereof with the curved tube, thereby enabling the brake cable to be fastened with the top end of the second brake arm via the curved tube. As the brake cable is triggered, the first and the second brake arms are actuated such that the brake shoes of both brake arms are at work to slow down or stop the bicycle. The fastening seat is composed of two connection members, a seat body, a first pivot, a second pivot, and a torsion spring. The two connection members are fastened pivotally and respectively at one end thereof with the top end of the first brake arm via the first pivot, and at another end thereof with the seat body via the second pivot. The curved tube is fastened with the seat body which is provided with a first retaining portion. The torsion spring is fitted over the second pivot such that both ends of the torsion spring urge the first pivot and the first retaining portion. As the brake shoes are engaged with the bicycle wheel rim, the torsion spring serves to provide an appropriate damping effect to prolong the lock-up time of the brake shoes.

The foregoing objectives, features, functions, and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 3:
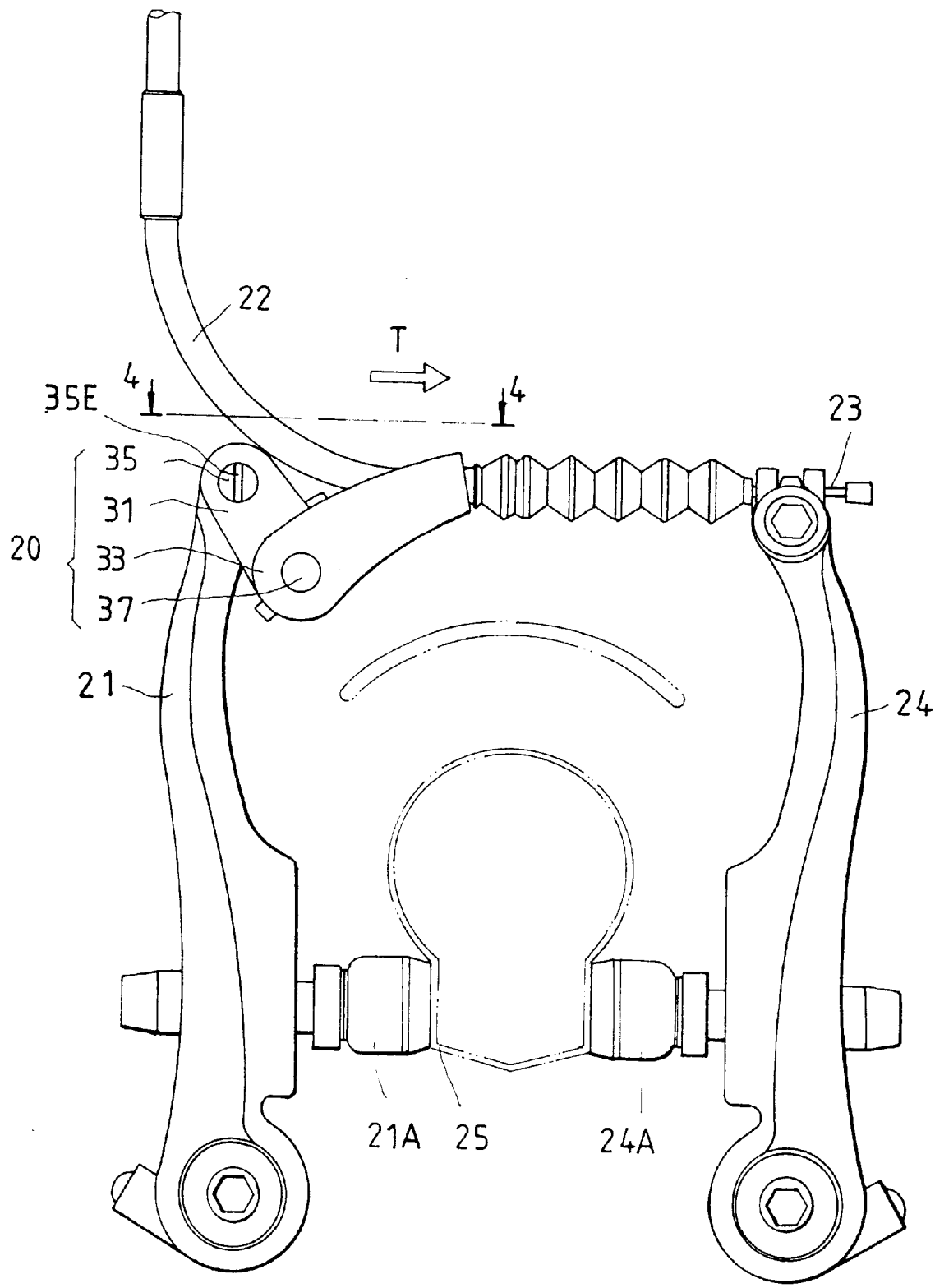
FIG. 3 shows a front view of the preferred embodiment of the present invention at work.

As shown in FIGS. 3–6, a bicycle V-type brake embodied in the present invention is composed of a curved tube fastening seat 20, which is fastened pivotally at one end thereof with the top end of a first brake arm 21, and at another end thereof with a curved tube 22. A brake cable 23 is fastened with the top end of a second brake arm 24 via the curved tube 22. As the brake cable 23 is triggered to actuate the two brake arms 21 and 24, the brake shoes 21A and 24A are engaged with a bicycle wheel rim 25 to slow down or stop the bicycle in motion, as illustrated in FIG. 3.

The seat 20 comprises two connection members 31, a seat body 33, a first pivot 35, a second pivot 37, and a torsion spring 39.

The connection members 31 are of an oblong platelike construction and are fastened pivotally and respectively at one end thereof with the first brake arm 21 by the first pivot 35, and at another end thereof with the seat body 33 by the second pivot 37.

The seat body 33 has two side plates 33A, an end plate 33B, and a receiving space 33C. The end plate 33B is provided with a through hole 33D for fastening one end of the curved tube 22. One of the two side plates 33A is provided with a first retaining portion 33E, which is located in the receiving space 33C. The two side plates 33A are fastened pivotally with the connection members 31 and are provided respectively with a first arresting block 33F and a second arresting block 33G, which are intended to confine the rotational angles of the two connection members 31 in relation to the side plates 33A.

Figure 4:
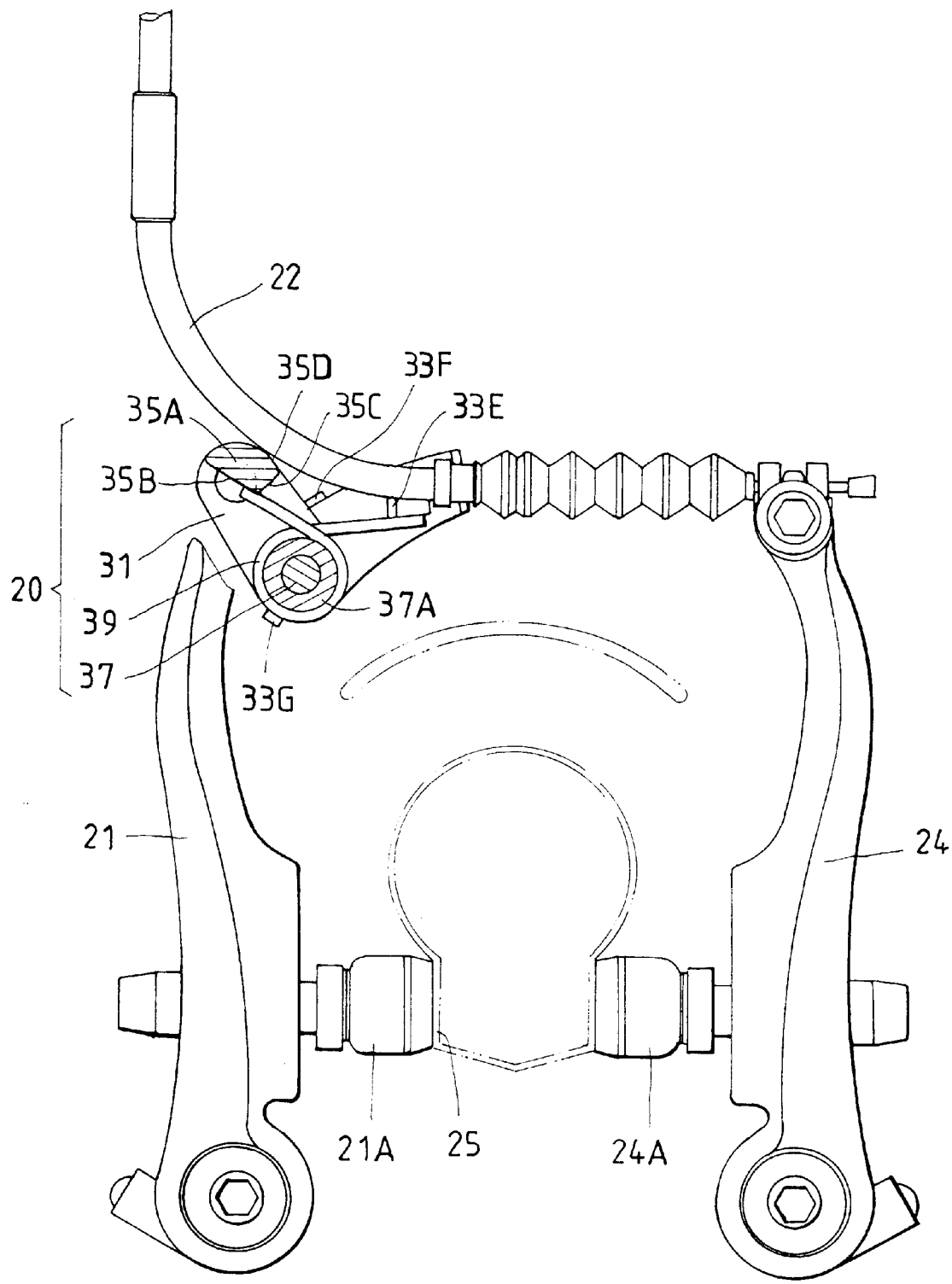
FIG. 4 shows a sectional view of a portion taken along the direction indicated by a line 4—4 as shown in FIG. 3.
Figure 5:
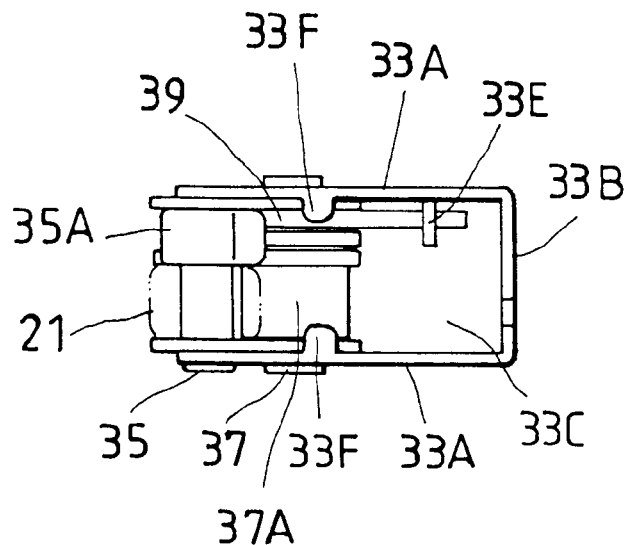
FIG. 5 shows a top view of the preferred embodiment of the present invention.
Figure 6:
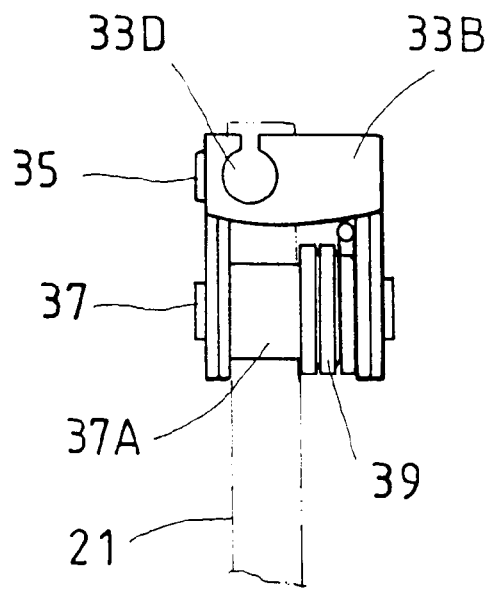
FIG. 6 shows a side view of the preferred embodiment of the present invention.
Figures 8A, 8B, 8C:
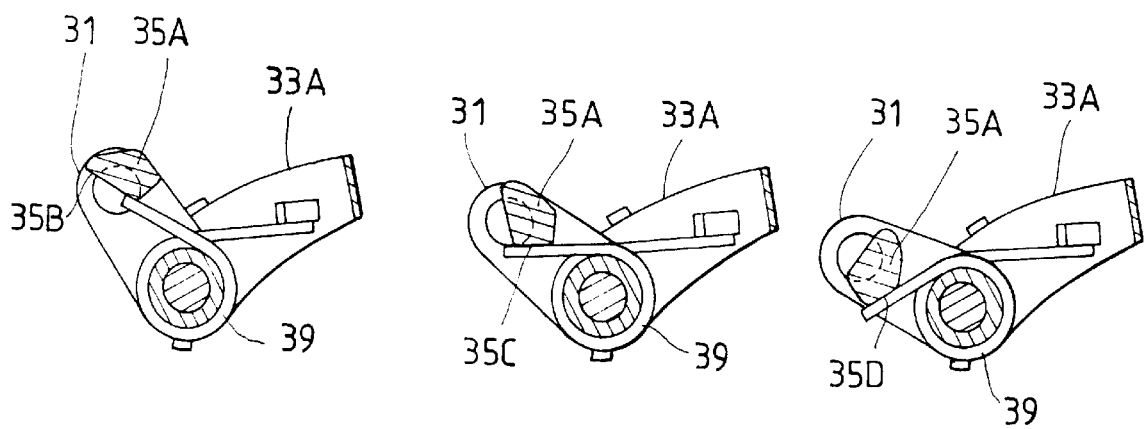
FIG. 8 show schematic views illustrating the various forms of setting up the torsion spring of the present invention.

The first pivot 35 has a second retaining portion 35A which is provided with a first retaining surface 35B, a second retaining surface 35C, and a third retaining surface 35D, as shown in FIGS. 4 and 8. The first pivot 35 has a slotted head 35E, as shown in FIG. 3.

The torsion spring 39 is fitted over a plastic bushing 37A of the second pivot 37 such that one end of the torsion spring 39 urges the second retaining portion 35A of the first pivot 35, and that another end of the torsion spring 39 urges the first retaining portion 33E of the seat body 33.

Figure 1:
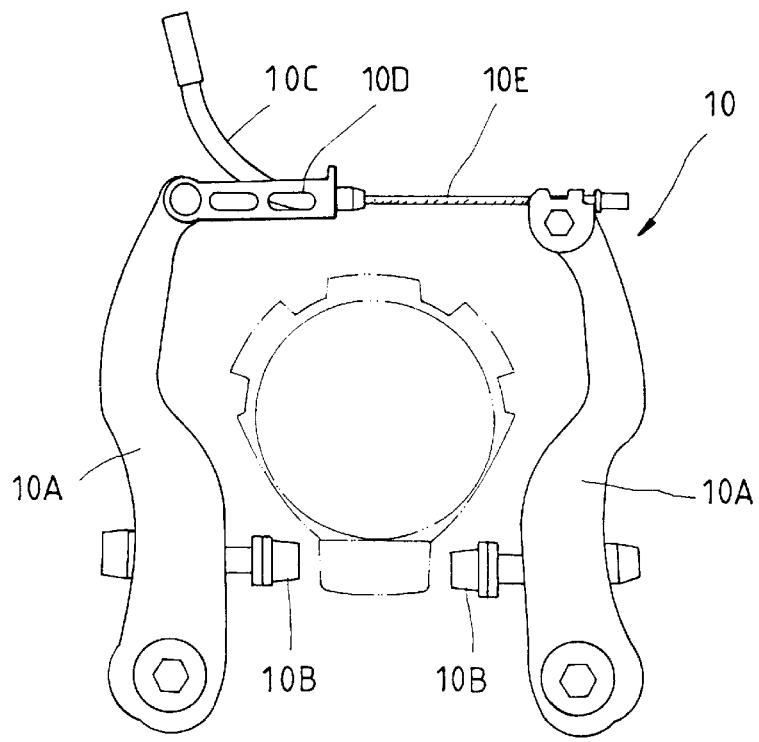
FIG. 1 shows a front view of a bicycle V-type brake of the prior art.
Figure 2:
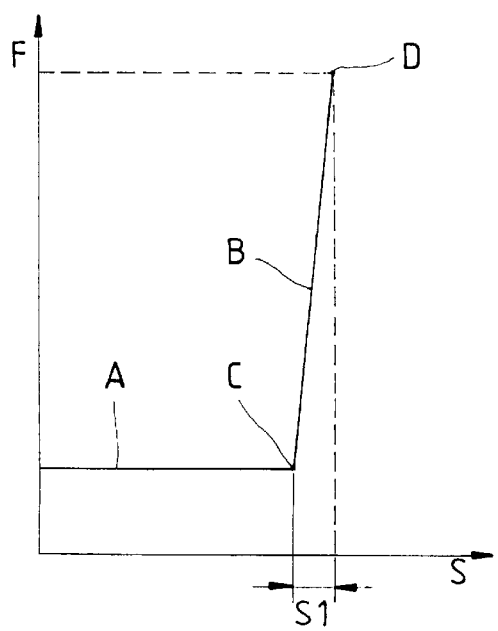
FIG. 2 shows a diagram illustrating the relationship between a brake lever grip force and a brake lever stroke of the bicycle V-type brake of the prior art.

As the brake cable 23 is triggered by the brake lever, the brake arms 21 and 24 are actuated to swivel such that the brake shoes 21A and 24A are caused to move toward the wheel rim 25 to bring about the braking action. As soon as the brake shoes 21A and 24A make contact with the wheel rim 25, the end plate 33B of the seat body 33 is pulled by the reaction force (T) brought about by the brake cable 23, as shown in FIG. 3. As a result, the end plate 33B of the seat body 33 is caused to move toward the second brake arm 24, thereby causing the seat body 33 to swivel in relation to the connection members 31. In the meantime, the torsional force of the torsion spring 39 and the damping forces of both ends of the torsion spring 39 work together against the reaction force (T) so as to confine the swiveling angle of the seat body 33. When the reaction force (T) is no greater than the torsional force of the torsion spring 39, the seat 20 of the present invention is a rigid element, which means that the seat 20 is corresponding in function to the bicycle V-type brake of the prior art. However, when the reaction force (T) is greater than the torsional force of the torsion spring 39, the seat body 33 of the seat 20 is caused to swivel in relation to the connection members 31. In view of the damping force provided by the torsion spring 39, the grip force (F) and the lever stroke (S) are gradually changed in direct proportion, as shown by the line E1 in FIG. 7. As the connection members 31 continue to swivel in relation to the seat body 33 until the connection members 31 are stopped by the second arresting block 33G, the seat 20 of the present invention becomes once again the rigid element, thereby resulting in an abrupt increase in the grip force (F), as shown by the line B' in FIG. 7. It must be noted here that the grip force (F) is a constant before the brake shoes 21 A and 24A make contact with the wheel rim 25, as shown by the line A' in FIG. 7, which coincides with the line A in FIG. 2.

Figure 7:
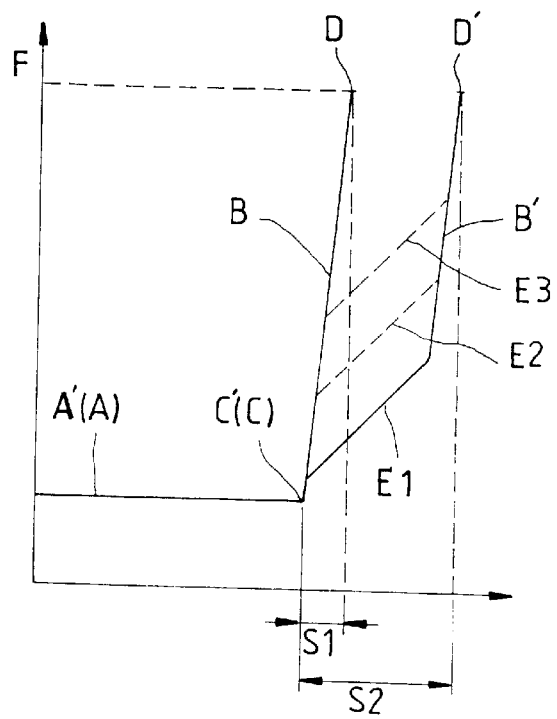
FIG. 7 shows a diagram illustrating the difference in the lever stroke between the V-type brakes of the prior art and the present invention.

As shown in FIG. 7, the brake shoes 21A and 24A of the present invention make contact with the bicycle wheel rim 25 at the contact point (C') and subsequently lock up the bicycle wheel rim 25 at the lockup point (D'). The lever stroke (S2) of the present invention is the distance between the contact point (C') and the lock-up point (D') and is greater than the lever stroke (S1) of the prior art. In other words, the braking action of the present invention is effected more gradually than that of the prior art.

The first pivot 35 can be rotated by means of a slotted screw driver engageable with the slotted head 35E, so as to enable the torsion spring 39 to urge the first retaining surface 35B, the second retaining surface 35C or the third retaining surface 35D, as shown in FIG. 8. This means that the torsion spring 39 has three different values of torsional force in relation to the grip force (F) and the lever stroke (S), as indicated by E1 line, E2 line, and E3 line in FIG. 7. As a result, the present invention is provided with three different leverages.

What is claimed is:
1. A bicycle brake comprising:
 a brake lever;
 a brake cable fastened at one end thereof with said brake lever;
 a first brake arm provided with a brake shoe fastened therewith;
 a second brake arm provided with a brake shoe fastened therewith such that said brake shoe of said second brake arm is opposite in location to said brake shoe of said first brake arm, said second brake arm fastened at one end thereof with another end of said brake cable via a curved tube; and
 a seat for fastening said curved tube such that said seat is fastened pivotally with said first brake arm;
 wherein said seat comprises:
  two connection members fastened pivotally and coaxially with said first brake arm by a first pivot;
  a seat body fastened pivotally with said two connection members by a second pivot, said seat body further fastened with one end of said curved tube, said seat body provided with a first retaining portion; and
  a torsion spring fitted over said second pivot such that one end of said torsion spring urges said first pivot, and that another end of said torsion spring urges said retaining portion of said seat body;
  said first brake arm capable of being actuated along with said second brake arm by said brake cable such that said brake shoe of said first brake arm and said brake shoe of said second brake arm move in opposite directions to make contact with a wheel rim of the bicycle, thereby causing said seat body to swivel in relation to said two connection members by a reaction force which is brought about by said brake cable and is greater than a torsional force of said torsion spring.

2. The brake as defined in claim 1, wherein said seat body has two side plates and an end plate; wherein said two connection members are fastened pivotally with said two side plates by said second pivot; wherein said first retaining portion is located in one of said two side plates; and wherein said end plate is fastened with said one end of said curved tube.

3. The brake as defined in claim 2, wherein said two side plates are provided respectively with an arresting block intended to confine the swiveling of said two connection members.

4. The brake as defined in claim 1, wherein said first pivot has a second retaining portion; and wherein said one end of said torsion spring urges said second retaining portion.

5. The brake as defined in claim 4, wherein said second retaining portion of said first pivot is provided with a plurality of retaining surfaces; and wherein said one end of said torsion spring urges any one of said retaining surfaces of said second retaining portion of said first pivot.

6. The brake as defined in claim 5, wherein said first pivot has a slotted head engageable with a slotted screw driver for turning said first pivot so as to enable said one end of said torsion spring to urge from one of said retaining surfaces to another one of said retaining surfaces, thereby resulting in a change in the torsional force of said torsion spring.

7. The brake as defined in claim 1, wherein said torsion spring is provided with a bushing fitted thereinto such that said bushing is fitted over said second pivot.

* * * * *